(12) United States Patent
Chapman et al.

(10) Patent No.: US 10,776,987 B2
(45) Date of Patent: Sep. 15, 2020

(54) AERIAL IMAGING HIGH-ACCURACY SCALE CALIBRATION

(71) Applicant: Disney Enterprises, Inc., Burbank, CA (US)

(72) Inventors: Steven M. Chapman, Burbank, CA (US); Mehul Patel, Burbank, CA (US); Joseph Popp, Burbank, CA (US); Steven Kosakura, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 29 days.

(21) Appl. No.: 15/912,487

(22) Filed: Mar. 5, 2018

(65) Prior Publication Data

US 2019/0272666 A1 Sep. 5, 2019

(51) Int. Cl.
| | | |
|---|---|---|
| *G06T 15/08* | (2011.01) | |
| *B64C 39/02* | (2006.01) | |
| *G06T 19/00* | (2011.01) | |
| *G06K 9/00* | (2006.01) | |

(52) U.S. Cl.
CPC .......... *G06T 15/08* (2013.01); *B64C 39/024* (2013.01); *G06K 9/0063* (2013.01); *G06T 19/003* (2013.01); *B64C 2201/123* (2013.01); *G06T 2207/10032* (2013.01)

(58) Field of Classification Search
CPC ..... G06T 15/08; G06T 19/003; B64C 39/024; G06K 9/0063

USPC .......................................... 345/419
See application file for complete search history.

(56) References Cited

U.S. PATENT DOCUMENTS

| | | | | |
|---|---|---|---|---|
| 5,343,395 | A * | 8/1994 | Watts | G05D 1/0676 701/16 |
| 5,500,516 | A * | 3/1996 | Durbin | G06K 7/10693 235/454 |
| 7,236,172 | B2 * | 6/2007 | Clavadetscher | G06T 15/00 345/419 |
| 9,592,912 | B1 * | 3/2017 | Michini | G01C 15/02 |
| 2009/0122008 | A1 * | 5/2009 | Melkis | G06F 3/0325 345/157 |
| 2017/0031369 | A1 * | 2/2017 | Liu | G05D 1/102 |
| 2017/0287343 | A1 * | 10/2017 | Bietz | G08G 5/0069 |
| 2019/0094149 | A1 * | 3/2019 | Troy | G01M 5/0008 |

\* cited by examiner

*Primary Examiner* — Hai Tao Sun
(74) *Attorney, Agent, or Firm* — Dorsey & Whitney LLP (57) ABSTRACT

The disclosure provides for a system of markers and methods of using the system of markers to provide a precise scene scale reference for captured aerial images. Each of the markers may include one or more pairs of aligned collimated light emitters, where each pair of light emitters is configured to emit two light beams that converge at a known distance from the marker. When two or more markers are used, the system of markers may be aligned in a unique physical orientation to form a shape of known dimensions (e.g., a line, a triangle, or square) that provides an accurate scene scale reference for captured images.

9 Claims, 8 Drawing Sheets

AERIAL IMAGING HIGH-ACCURACY SCALE CALIBRATION

BRIEF SUMMARY OF THE DISCLOSURE

The disclosure describes a system of markers and methods of using the system of markers to provide an accurate scene scale reference for captured aerial images.

In one example, a method includes: placing and aligning a plurality of markers in a location such that a surface of each of the plurality of markers is illuminated by a pair of intersecting collimated light beams that are emitted by a pair of light emitters of another one of the plurality of markers, where each of the pairs of light beams converge at a known distance from the marker that emits the pair of light beams; after placing and aligning the plurality of markers, capturing an aerial image of the location, where the captured aerial image includes the plurality of placed and aligned markers; and using the known distance and placed and aligned markers in the captured aerial image to create a scale for the image. In some implementations, the plurality of aerial images may be captured using an unmanned aerial vehicle.

In particular implementations, the method may further include: after placing and aligning the plurality of markers, capturing a plurality of aerial images of the location, wherein each of the plurality of captured aerial images include the plurality of placed and aligned markers; and generating a three-dimensional model of the location using the plurality of captured images, where objects in the three-dimensional model are scaled using the known distance and placed and aligned markers in the plurality of captured aerial images.

In some implementations, the plurality of markers comprise two markers placed and aligned in a linear configuration. In some implementations, the plurality of markers comprise three markers placed and aligned in a triangular configuration, or four markers placed and aligned in a rectangular configuration.

In some implementations, each of the pluralities of markers comprises a first pair of light emitters that emit light beams that converge at a first known distance from the marker in a first direction, and a second pair of light emitters that emit light beams that converge at a second known distance from the marker in a second direction. To facilitate placement and alignment, each of the markers may emit collimated light in the visible light spectrum.

In some implementations, placing and aligning the plurality of markers includes mounting each of the plurality of markers on a stand such that each of the plurality of markers are level and vertically aligned with each of the other plurality of markers.

In some implementations, a top surface of each of the plurality of markers comprises a pattern, and the method further includes: determining a center of each of the plurality of markers in the captured image using at least the pattern.

In particular implementations, the known distance is greater than 10 meters, greater than 20 meters, greater 30 meters, greater than 40 meters, or even greater 50 meters.

In another example, a system includes: a first marker including a pair of light emitters that emit light beams that converge at a first known distance from the first marker; a second marker including a pair of light emitters that emit light beams that converge at a second known distance from the second marker; and a non-transitory computer-readable medium having machine-readable instructions stored thereon that when executed: receive an aerial image of a location, the aerial image including a plurality of markers; and using at least the first known distance, the second known distance, and the plurality of markers in the aerial image, create a scale for the image. In some implementations, the system may further include: a plurality of stands to level and vertically align the first and second markers.

In implementations, the first marker includes a first pair of light emitters that emit light beams that converge at a first known distance from the first marker in a first direction, and a second pair of light emitters that emit light beams that converge at a second known distance from the first marker in a second direction. Each of the light emitters of the first and second markers may emit collimated light in the visible light spectrum.

In implementations, execution of the instructions may further causes the system to: receive a plurality of aerial images of the location, each of the plurality of aerial images including the plurality of markers; and generate a three-dimensional model of the location using the plurality of aerial images, where objects in the three-dimensional model are scaled using at least the first known distance, the second known distance, and the plurality of markers in the plurality of aerial images.

In a further example, a marker includes: a power source to power a plurality of light emitters; a first pair of collimated light emitters, the first pair of collimated light emitters to emit visible light beams that converge at a known distance in a first direction; a second pair of collimated light emitters, the second pair of collimated light emitters to emit visible light beams that converge at a known distance in a second direction, and an outer surface including a plurality of notches, where each of the collimated light emitters is to emit light through a respective one of the plurality of notches.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not exhaustive and do not limit the disclosure to the precise form disclosed.

DETAILED DESCRIPTION

Although photo-based three-dimensional (3D) scans and aerial surveys have begun to approach the detail level of Lidar data, there is as yet no reliably accurate method to scale data collected of large scenes such as sets or locations. For example, tape measurements are unreliable when taken of a large scale area. When the tape measurements are off by even a small fraction of the measured distances (e.g., a few percentile points), these errors are greatly amplified when used to determine dimensions of a large scale area (e.g., a city block, an open field, a park, or other large scene). This inaccurate scaling can be problematic when using aerial or other images to photogrammetrically create three-dimensional models.

Another conventional method for scaling data is referencing a "known" object in aerial photographs. For example, the length of a car or other known object may provide a rough reference for determining scale. However, such conventional methods suffer greatly from cumulative error and are unreliable for any accurate measurements that may entail a significant cost where there is error.

Although large markers of known dimensions could also potentially be used to provide an accurate scaling reference in aerial images of large scenes, such markers would be impractical for general use. For example, it would not be practical for human operators to carry, transport, or store physical markers having a diameter of over 10 meters to various scene locations.

To this end, the disclosure describes a system of marker devices ("markers") and methods of using the system of markers to provide an accurate scene scale reference for captured aerial images. In accordance with implementations, each of the markers may include one or more pairs of aligned light emitters (e.g., lasers or diodes), where each pair of light emitters is configured to emit two light beams that intersect and converge at a known distance from a point of the marker (e.g., the center of the marker). When two or more markers are used, the system of markers may be aligned in a unique physical orientation to form a shape of known dimensions (e.g., a line, a triangle, or square) that provides an accurate scene scale reference for captured images.

As will be appreciated from the foregoing disclosure, the described system of markers allows for hand placement of the markers while maintaining a high level of accuracy. Additionally, the described system of markers may provide for a relatively inexpensive and portable solution to the problem of providing a marker in photographs of large scenes for precise scaling.

Figure 1:
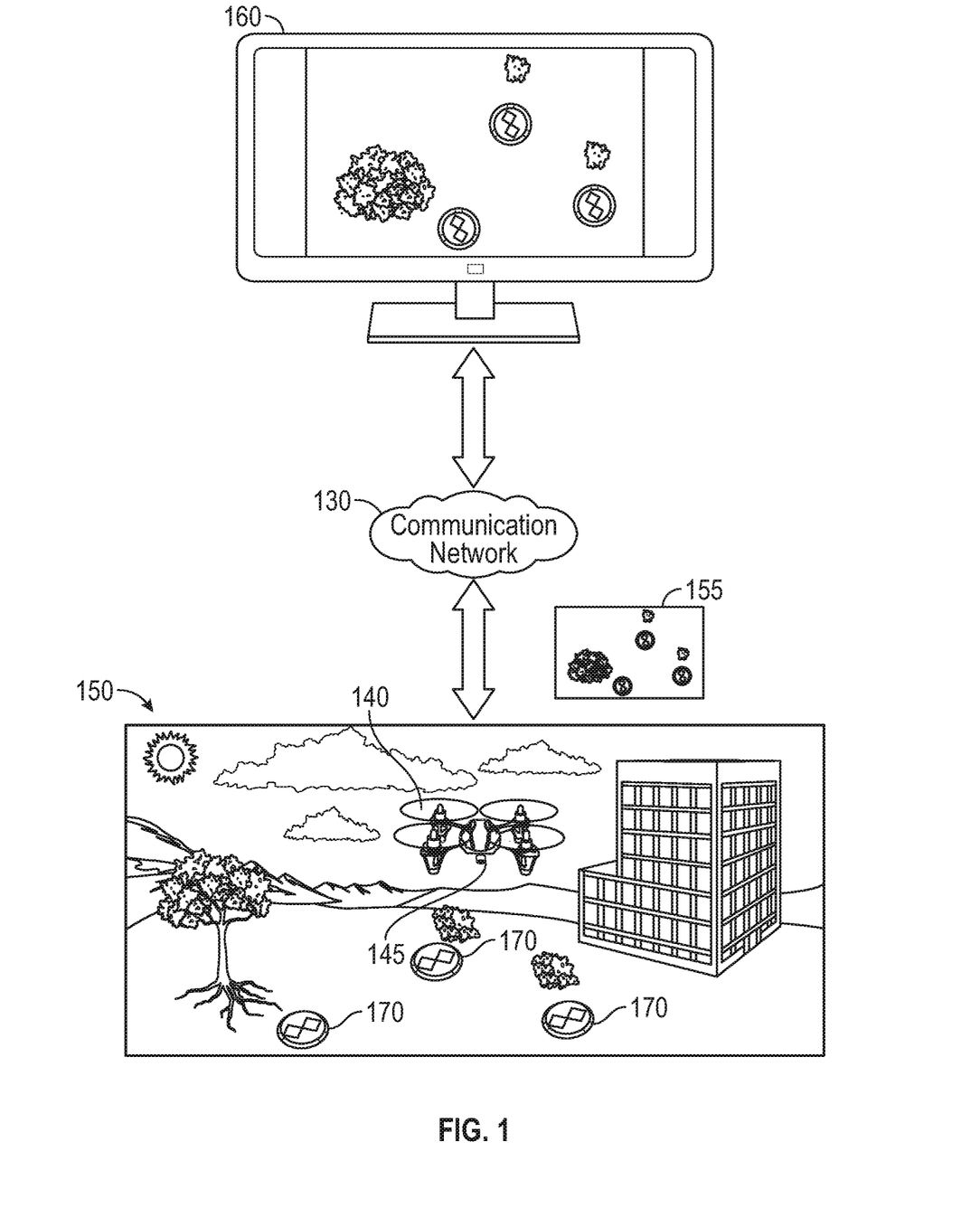
FIG. 1 illustrates an example environment in which the disclosure may be implemented.

FIG. 1 illustrates an example environment 100 in which the disclosure may be implemented. FIG. 1 will be described together with FIG. 2, which is an operational flow diagram illustrating an example method 200 for creating a three-dimensional model of an outdoor location with accurate scaling using a system of markers in accordance with implementations of the disclosure.

Prior to producing video or photographic content at an outdoor location 150, the location may be scouted. For example, decisions as to whether to shoot a movie or television series at a location may be made by individuals called "scouts" who are sent to the site. A location scout may examine the environment, capture photographs (and possibly video) of the area, and send this information back to the production team.

To facilitate the scouting process, unmanned aerial vehicles (UAV) 140 (e.g., quadcopter drones) may be equipped with a camera 145 (e.g., an omnidirectional camera) and remotely controlled by scouts to capture one or more aerial images 155 of location 150. Utilizing an aerial unmanned vehicle in this context may facilitate traversal of outdoor location 150 and may allow image capture from a variety of different angles. For example, a member of a video production team may remotely control UAV 140 to capture images within a particular geographical location. Alternatively, UAV 140 may automatically scout and capture images of location 150 using a global positioning system (GPS) in combination with predefined geographical coordinate boundaries for location 150 such as latitude, longitude, and/or altitude. In other implementations, a digital single-lens reflex (DSLR) camera or other suitable camera may be manually used by a scout to capture aerial images.

To provide a precise scene scale reference for captured aerial images of location 150, a system of two or more markers 170 may be placed in location 150 in accordance with implementations described. For example, the markers 170 may be placed by a human scout or by a machine. As further described below, each of the markers 170 may include one or more pairs of aligned light emitters (e.g., lasers or diodes), where each pair of light emitters is configured to emit two light beams that converge at a known or predetermined distance from a point of the marker (e.g., the center of the marker). For example, the light beams may converge at 25 meters, 50 meters, 75 meters, 100 meters, etc. When the two light beams converge, they may partially or completely overlap.

Figure 2:
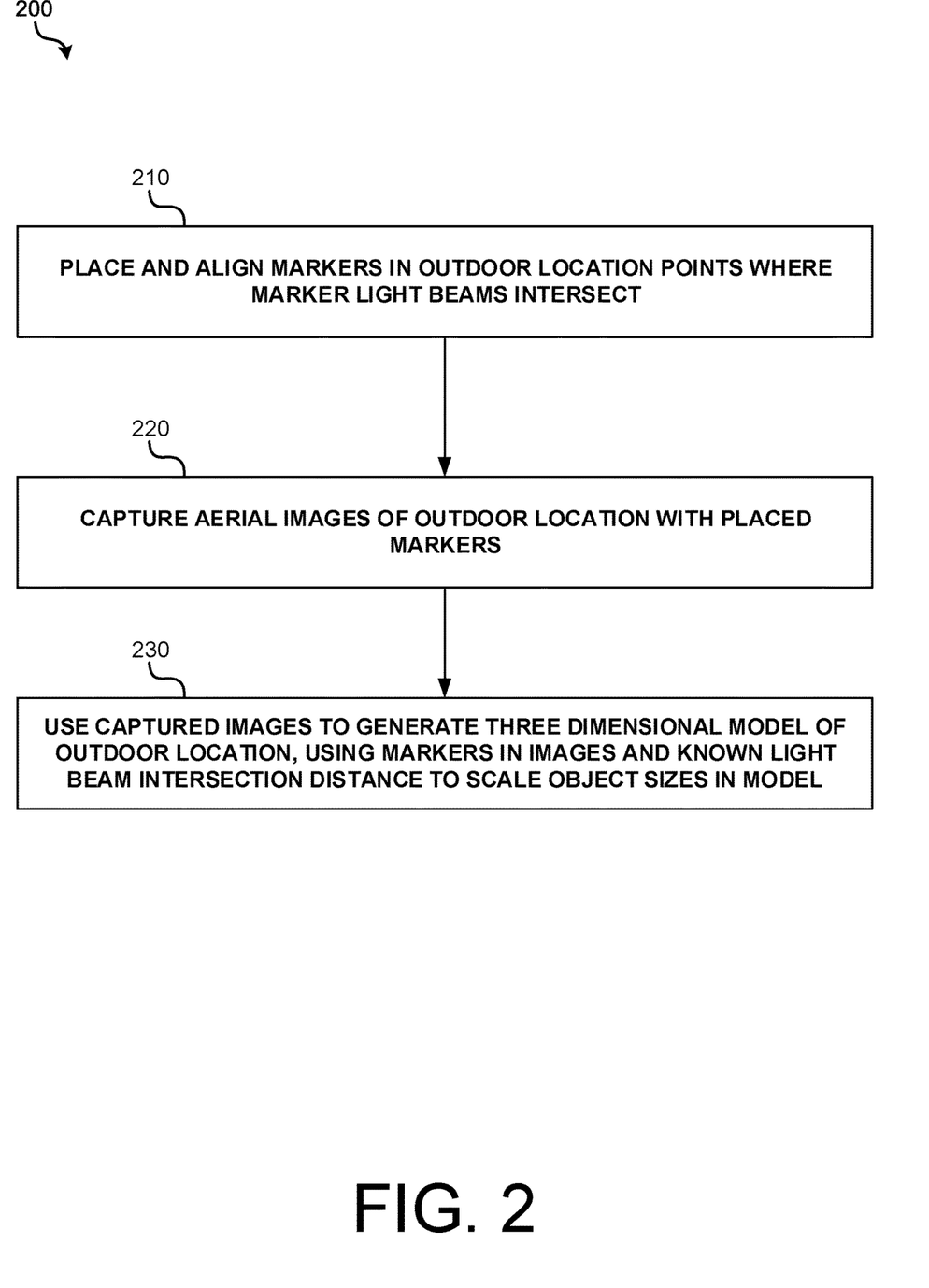
FIG. 2 is an operational flow diagram illustrating an example method for creating a three-dimensional model of an outdoor location with accurate scaling using a system of markers, in accordance with implementations of the disclosure.

As such, at operation 210, the markers may be aligned in the outdoor location at location points where light beams emitted by the marker light emitters converge. For example, each of the three markers illustrated in location 150 may be aligned and placed in a triangular arrangement such that a pair of light beams emitted by the other two markers converge at an edge, at the center, or some other point of the marker. Although a triangular arrangement is illustrated in the example of FIG. 1, in other implementations, the markers may be aligned and placed in other arrangements depending on the number of markers and the scaling reference needs of the captured aerial images. For example, a system of markers may be aligned in a line of two markers, multiple lines of two markers, a square of four markers, or some other configuration.

In implementations, aligning the markers may also include leveling the markers along a vertical dimension such that the markers have the same height (e.g., the same or substantially the same absolute altitude). This may be particularly advantageous in cases where the topography of the location is not mostly level (e.g., a location with several small hills or where the ground slopes in one direction). Vertical alignment may be achieved by placing the markers on a stand and using tools such as an altimeter, a cross-line laser leveler, or some other tool that may be used to keep the markers 170 aligned along the vertical dimension.

As illustrated in the example of FIG. 1, the top surface of the body of markers 170 is shaped as disks having a checkerboard pattern. In this example, the markers may be placed and aligned in location 150 such that the light emitters converge near or at a point on the outer circumference of the disks. In other implementations, the top surface of the body of markers 170 may have some other shape such as, for example, a rectangular shape, a star shape, or an irregular shape. The top surface of the body of markers 170 may also comprise other patterns besides a checkerboard pattern. In implementations, the shape and design of the top surface of markers 170 may be configured such that it provides a recognizable reference for image recognition software to identify the markers in an aerial image and/or determine the center of the markers for determining scaling distances.

Following alignment and placement of the markers, at operation 220, one or more aerial images 155 of the outdoor location with the placed markers may be captured (e.g., using UAV 140). In implementations where multiple aerial images 155 are used to photogrammetrically create a 3D model of the outdoor location, the number of captured images 155 may depend on a minimum threshold needed to create a 3D model of the outdoor location, a desired accuracy of the 3D model, the size of the outdoor location, and specifications of camera 145 (e.g., field of view, resolution, dynamic range, etc.)

Following capture of images 155, UAV 140 may transmit the captured images 155 to one or more user devices 160 over communication network 130 (e.g., a radio frequency network, a BLUETOOTH network, an infrared network, a wired network, etc.). As illustrated, user device 160 is a desktop computer. However, the user device may include a smartphone, a tablet, a laptop, a desktop computer, a server, a wearable device such as a HMD, or other suitable device that may be used to create a 3D model of the location where markers in the images are used to accurately scale object sizes in the models. Alternatively, UAV 140 may transmit images 155 to an intermediary device that then transmits the images 155 to a user device that creates the 3D model of the location and/or simulates the lighting conditions of the location.

Following receipt of captured images 155, at operation 230, a user device 160 may use the captured images to generate a 3D model of the outdoor location 150, where identified markers in the image and the known convergence distances of the light beams emitted by the markers are used to scale object sizes in the model. The generated 3D model may be a polygonal model, a curved model, a digitally sculpted model, or other suitable model. A variety of photogrammetric techniques may be used to generate the 3D model. In one implementation, two dimensional images may be aligned by finding common points and matching their positions. As more points are found and matched, the position at which each photo was taken can be determined, and a sparse point cloud can be created. A dense point cloud can be generated by interpolating points on the sparse point cloud, using the images to add more detail. The dense point cloud can be converted into a wireframe model, and a surface can be filled in on the wireframe model, creating a mesh. In a particular implementation, a 3D model may be created by using a large-scale structure-from-motion (SfM) algorithm that recovers a triangular mesh.

During generation of the 3D model, markers in the images may be recognized and used to create a scaling reference for the relative and absolute sizes of objects. For example, a scale of the 3D model may be determined by dividing the known separation of the markers (e.g., based on known convergence distance of light beams) by the model's measurement of the same points. By way of example, if it is known that the markers are separated by 10 meters, and the 3D model shows them as being separated by 3.5 meters, the 3D model may be scaled by a factor of 10/3.5 to match the known value.

In implementations, the effectiveness of the 3D model for simulating lighting of the actual location may be enhanced by texture mapping the 3D model (e.g., adding color, surface texture, reflectivity, transparency, or other detail) to capture details such as concrete on buildings, canvas on awnings, glass in windows, highly reflective surfaces, etc. One or more texture images having one or more dimensions may be applied to the 3D model.

Although in the example described above, markers 170 are used to provide a scale reference in captured images for generating a 3D model, it should be emphasized that the disclosure is not limited to this application. For instance, it may be desirable to include markers 170 in an image to provide a scale reference for a single overhead 2D view of a location.

Figure 3:
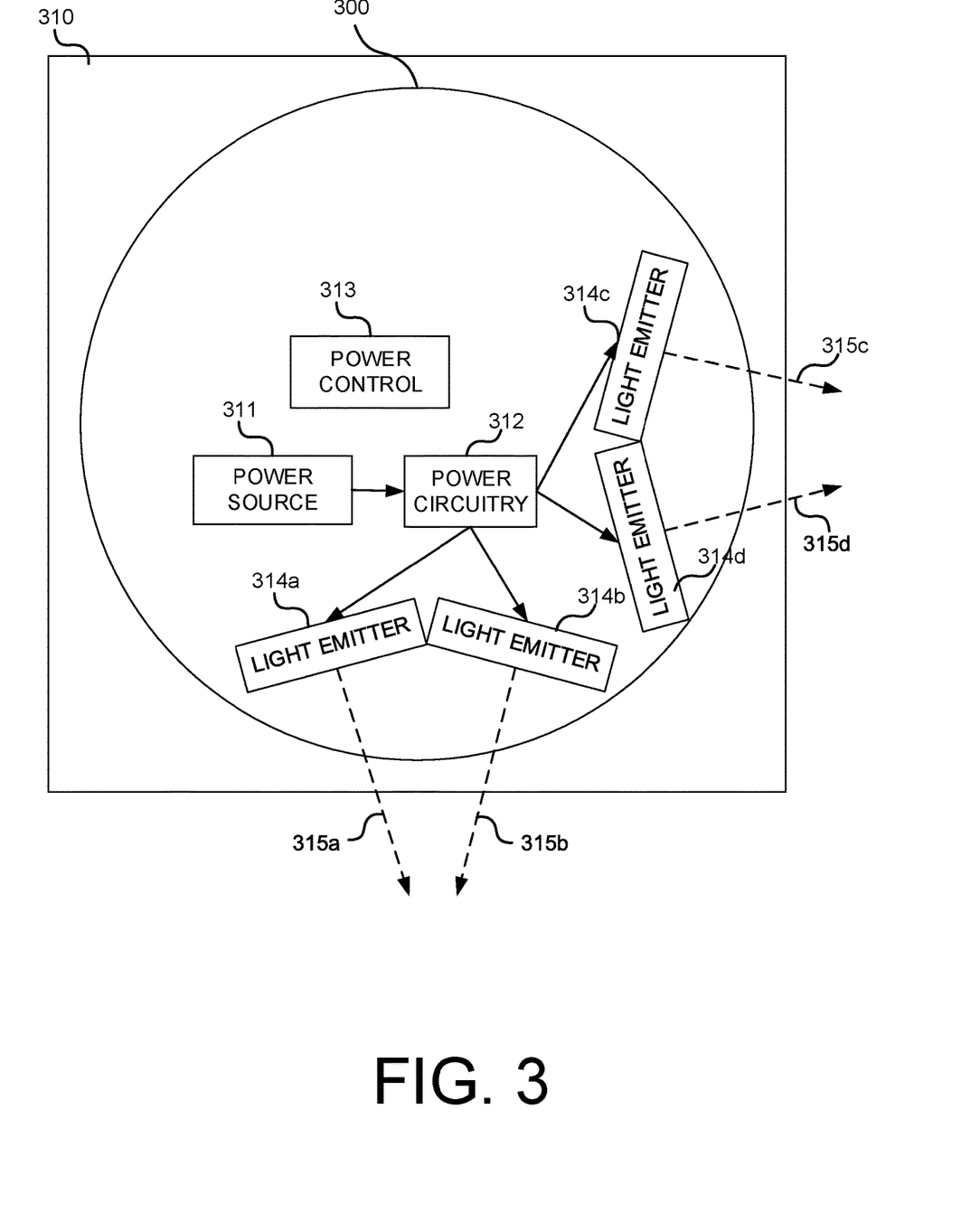
FIG. 3 is a block diagram illustrating a top view of an example marker, in accordance with implementations of the disclosure.

FIG. 3 is a block diagram illustrating a top view of an example marker 300 in accordance with implementations. Marker 300 may include a power source 311, power circuitry 312, a power control 313, a first pair of light emitters 314*a*-314*b*, and a second pair of light emitters 314*c*-314*d*.

Power source 311 may be a battery such as a coin cell battery, a photovoltaic cell battery or other suitable battery or power source that powers light emitters 314*a*-314*d* through power circuitry 312. In alternative implementations, each light emitter may include its own power source, or combinations of light emitters may share respective power sources. A power control 313 may be implemented as a switch to turn power on or off (e.g., to turn the light emitters on/off). In some implementations, power control 313 may include controls for turning on/off individual light emitters or pairs of light emitters.

Light emitters 314*a*-314*d* may be lasers, laser diodes, or some other type of light emitter that may emit collimated light beams 315*a*-315*d* such that the light beam radius does not substantially increase over the distances that markers 300 are separated. For example, at a distance of 50 meters, the light beam may illuminate a surface of another marker with a beam having a cross-sectional radius (e.g., a laser dot) of about 1-2 centimeters. In implementations, the emitted light beams 315*a*-315*d* may be in the visible color spectrum (e.g., red waveband or green waveband) to facilitate visual alignment and placement of the markers with respect to the converging light beams. In some implementations, the light beams of a pair of converging light beams may include light beams in different colors in the color spectrum (e.g., red beam and green beam or red beam and blue beam) to facilitate visual alignment and placement of the markers. For example, a red laser dot and a green laser dot may be projected on the surface of an illuminated surface, and these two dots may be centered to find the point of convergence.

In example marker 300, the light emitters are configured such that light emitter pair 314a-314b emits light beams 315a-315b that converge at a predetermined or known distance from the marker along a first direction, and light emitter pair 314c-314d emits light beams 315c-315d that converge at a predetermined or known distance from the marker along a second direction. In the example of FIG. 3, the first and second directions are orthogonal and have an angular displacement of 90 degrees. In other implementations, the angular displacement may be 60 degrees, 120 degrees, 180 degrees, or some other suitable displacement depending on how the other markers are placed in the scene.

The predetermined distance of convergence of each light beam pair may be 10 meters, 20 meters, 30 meters, 50 meters, 100 meters, or even greater depending on the scaling distances needed for one or more aerial images of a location. Additionally, the predetermined distance of convergence of each light beam pair need not be the same. For example, light beams 315a-315b may converge at 50 meters and beams 315c-315d may converge at 100 meters. In some implementations, the predetermined distance of convergence may be fixed for a light emitter pair. In other implementations, the predetermined distance of convergence may be adjustable. For example, marker 300 may include one or more motors and actuators for rotating a pair of light emitters inward (i.e., toward each other) to decrease the distance of convergence, or outward (i.e., away from each other) to increase the distance of convergence. In these implementations, the distance of convergence may be adjusted in stepwise increments such as 1 meter, 2 meters, etc.

Although two pairs of light emitters are illustrated in the example implementation of marker 300, in other implementations the marker may include one pair of light emitters or more than two pairs of light emitters. For instance, in environments where marker 300 is configured to be aligned with only one other marker, only one pair of converging light emitters may be needed.

Also illustrated in the example of FIG. 3 is a stand 310 on which marker 300 may be mounted to vertically align with other markers (e.g., to have the same absolute altitude). The stand may be a tripod having an adjustable height or other suitable platform that may be height adjusted and provides a surface for mounting marker 300. In implementations, the stand 310 may include a bubble level or other level device for leveling along a horizontal plane. Stand 310 may also include or be mounted with an altimeter, a laser line leveler, or other suitable device for ensuring that marker 300 is vertically aligned (e.g., at substantially the same absolute altitude) with other markers positioned at locations where light beams 315a-315b converge or where light beams 315c-315d converge. The other markers may be similarly positioned on height adjustable stands. In some implementations, marker 300 and stand 310 may be integrated into one device.

In implementations, marker 300 may be light weight and portably-sized to facilitate placement in different scene locations during scouting of a location. For example, marker 300 may be disk-shaped and have a diameter of less than 2 meters, less than 1 meter, or even less than 0.5 meters.

Figure 4:
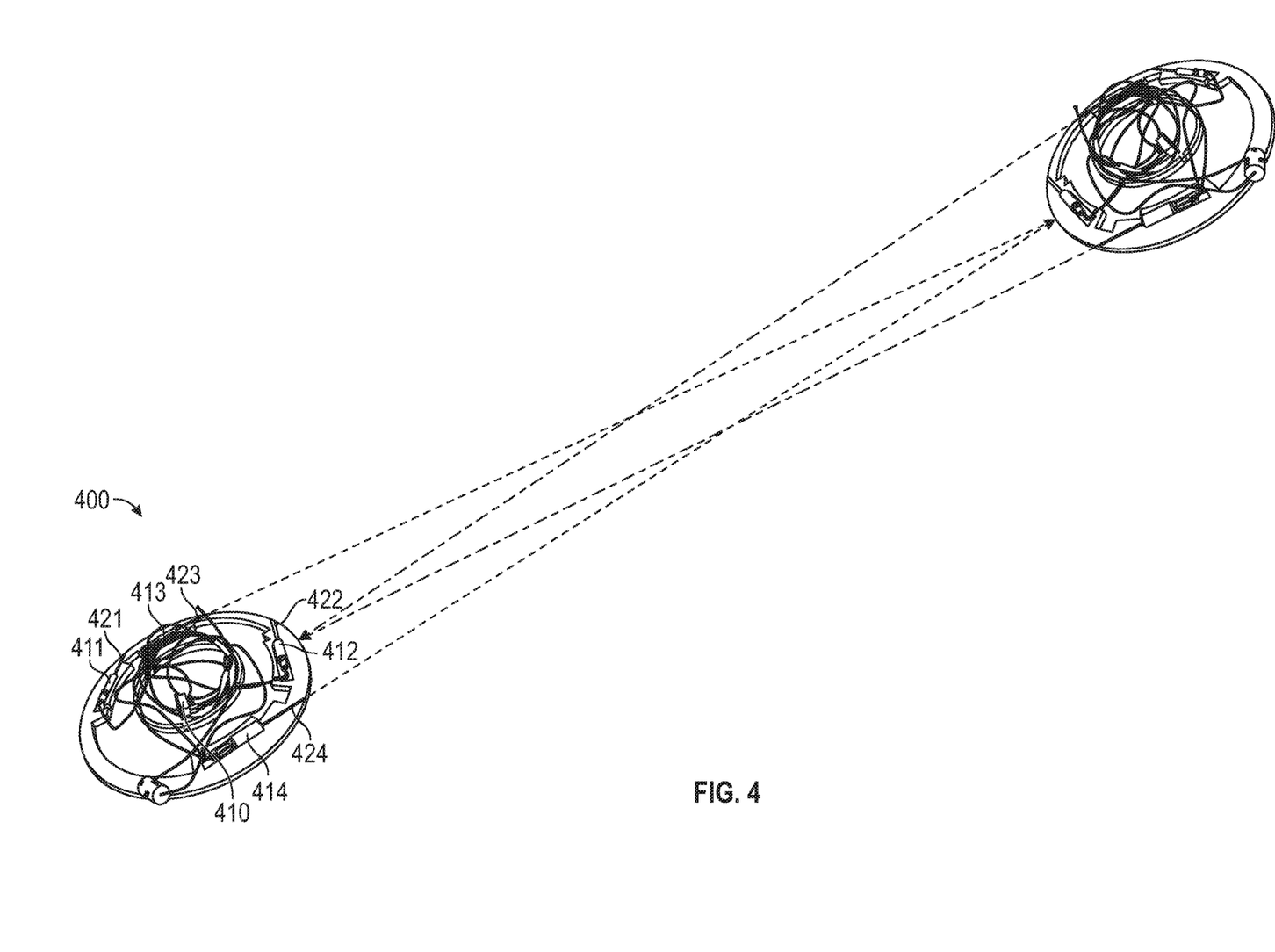
FIG. 4 illustrates an example internal design of an opened marker in alignment with another open marker, in accordance with implementations of the disclosure.

FIG. 4 illustrates an example internal design of an opened marker 400 in alignment with another open marker, in accordance with implementations. As illustrated, marker 400 is disk-shaped and includes a power source 410, a first pair of light emitters 411-412 (e.g., lasers) that emit collimated light beams that converge at a predetermined distance in a first direction, and second pair of light emitters 413-414 (e.g., lasers) that emit collimated light beams that converge at a predetermined distance in a second direction (e.g., at the location of the second marker). As also illustrated, each light emitter 411-414 is positioned in a groove and light beams emitted by each light emitter are guided through a respective groove 421-424 to ensure and maintain precise alignment of the system. When the marker 400 is fully assembled, the ends of each groove may provide an aperture or notch through which each light beam is guided.

In some implementations, the entrance of grooves 421-424 may also provide an alignment point for aligning incoming converging light beams from other markers. In other implementations, some other alignment point on the surface of marker 400 may be used. For example, alignment points may be centered or otherwise distributed between adjacent grooves.

Figure 5:
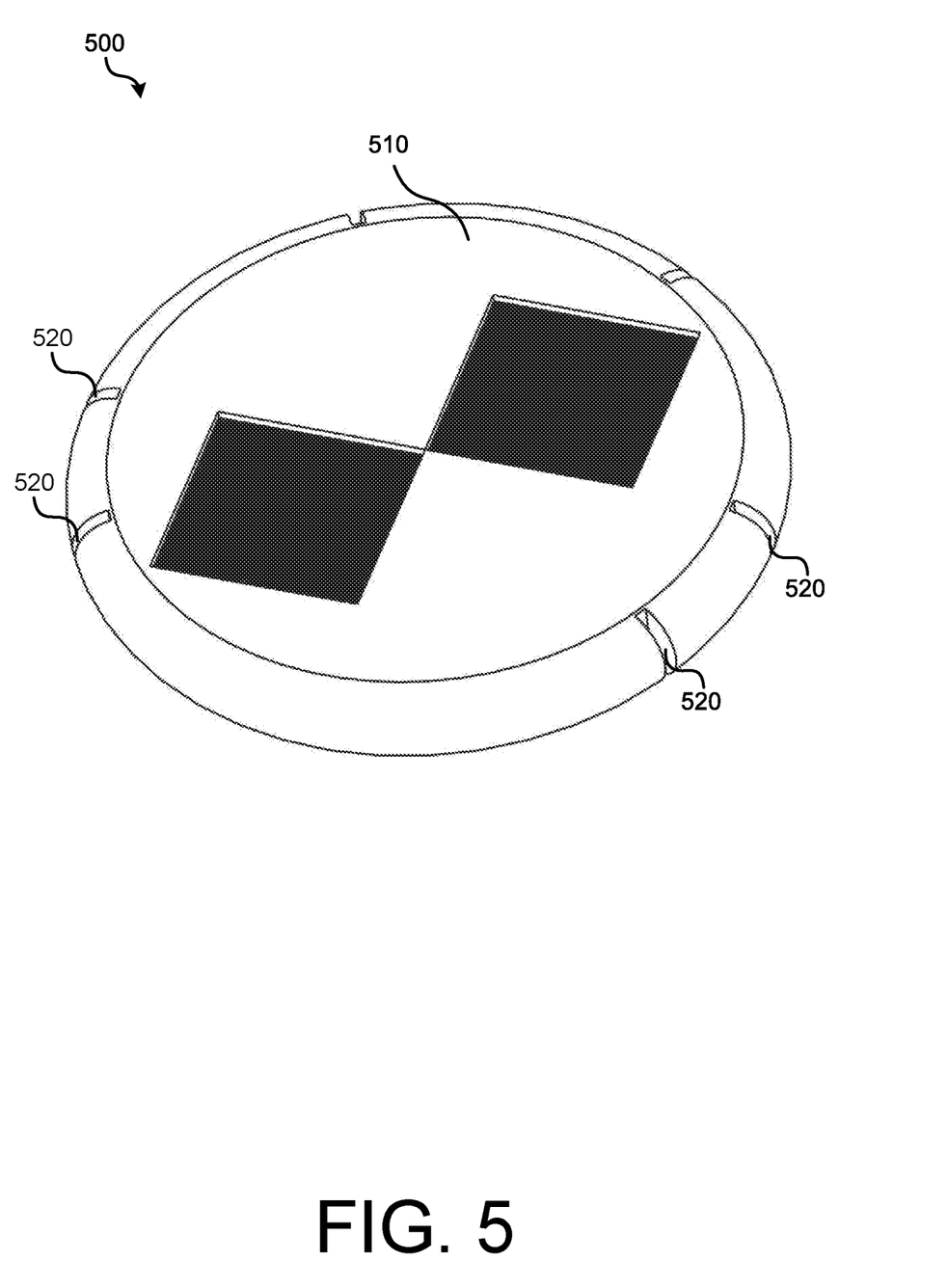
FIG. 5 illustrates an example external design of an assembled marker, in accordance with implementations of the disclosure.

FIG. 5 illustrates an example external design of an assembled marker 500 in accordance with implementations. As illustrated, a top surface 510 of marker 500 includes a checkerboard pattern that may facilitate identification of the center of marker 500 in an aerial image (e.g., using imaging recognition software). In other implementations, the top surface of marker 500 may include some other pattern (e.g., a bullseye) that facilitates identification of the center of marker 500. Assembled marker 500 additionally includes notches 520 through which light emitters emit light. As illustrated in this example, marker 500 has three notch pairs. In example marker 500, notches 520 may be symmetrically arranged around the disk such that the marker may be used in different positions in a scene location.

Figure 6:
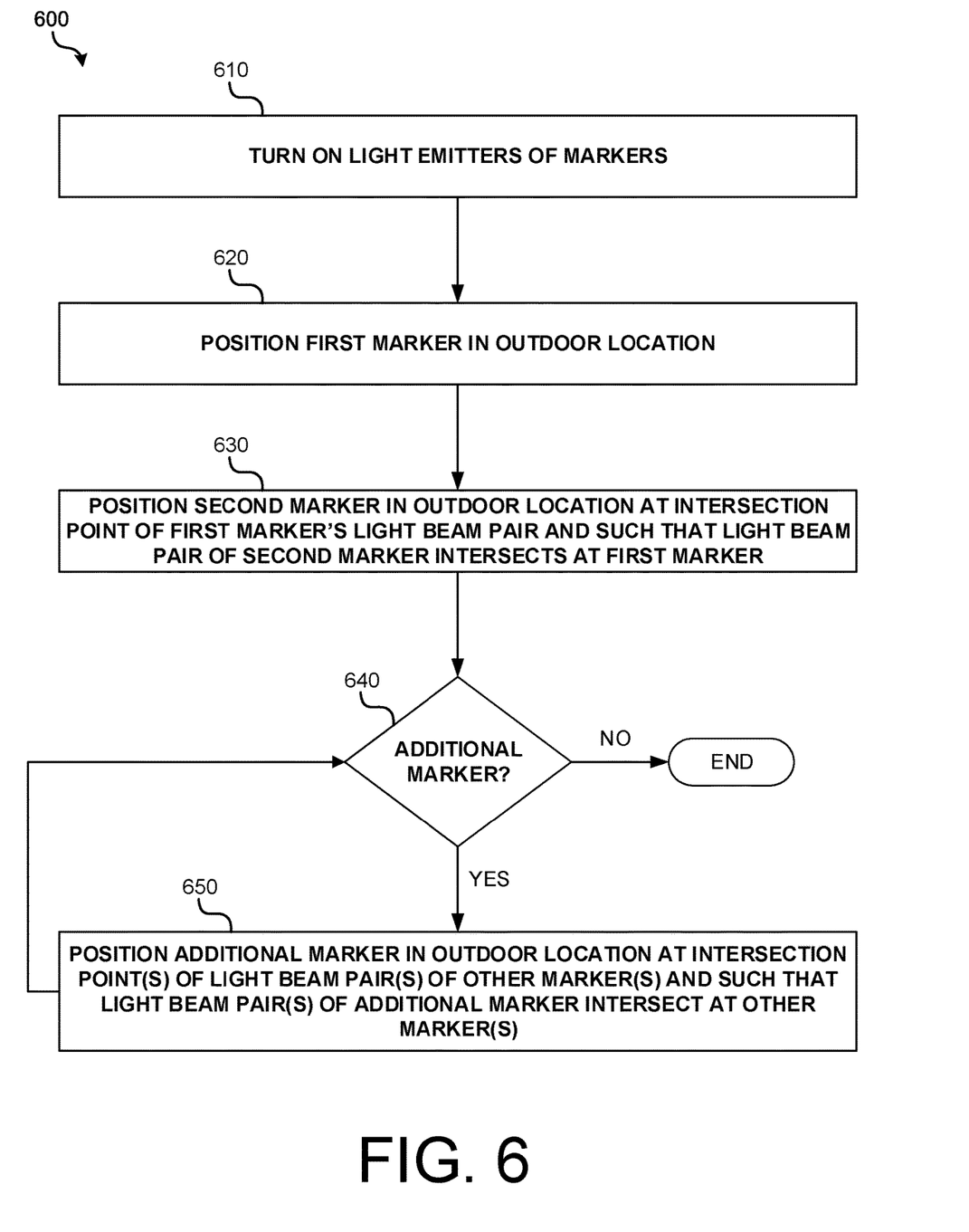
FIG. 6 is an operational flow diagram illustrating an example method that may be performed to align a system of markers in outdoor location points where marker light beam pairs converge, in accordance with implementations of the disclosure.

FIG. 6 is an operational flow diagram illustrating an example method 600 that may be performed to align a system of markers in outdoor location points where marker light beam pairs converge. At operation 610, the light emitters of the system of markers may be turned on. Light emitters may be turned on before any markers are positioned, or light emitters may be turned on as needed as markers are positioned. At operation, 620, the first marker may be positioned in the outdoor location. For example, the first marker may be leveled on a stand and positioned to emit light beams that converge in one or more directions at known distances. At operation 630, a second marker may be positioned in the outdoor location at a convergence point of a light beam pair of the first marker and such that a light beam pair of the second marker converges at the first marker. By way of example, a marker 500 may be positioned such that visible laser dot pairs substantially overlap and are projected between adjacent grooves 520 on a surface of marker 500 or some other location on a surface of marker 500. During positioning, marker 500 may be leveled on a stand such that it is in vertical alignment with the other marker. Additionally, marker 500 may be positioned such that it similarly illuminates another marker having the same configuration.

If there are additional markers in the system of markers (decision 640), at operation 650 the additional marker may be similarly positioned such that they are illuminated by converging light beam pairs from one or more of the other markers and such that they similarly illuminate one or more of the other markers. Operation 650 may be iterated until all markers are positioned.

Figure 7:
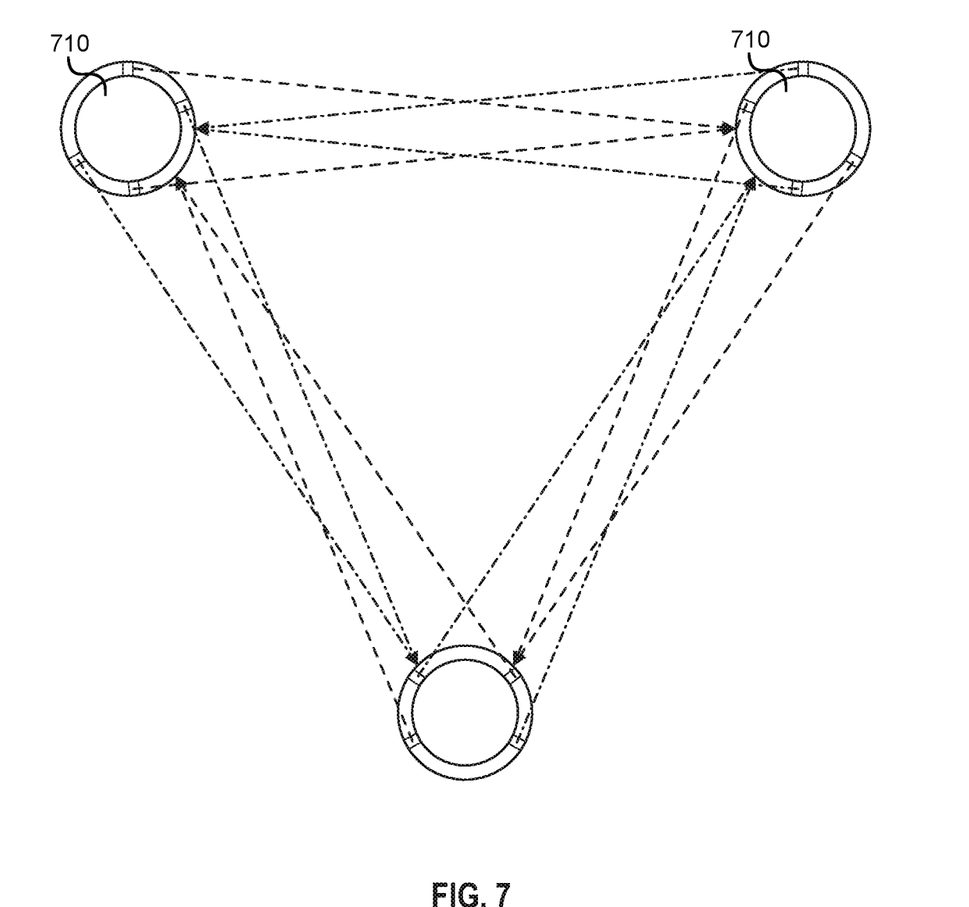
FIG. 7 is a schematic diagram illustrating an example configuration of a system of three identical disk-shaped markers that are aligned and positioned in a location, in accordance with implementations of the disclosure.

FIG. 7 is a schematic diagram illustrating an example configuration of a system of three identical disk-shaped markers 710 that are aligned and positioned in a location. As illustrated, the three markers 710 are positioned in a triangular configuration where each dimension of the triangle has a known distance based on a known convergence distance from a center of a marker and/or known dimensions of the markers.

Figure 8:
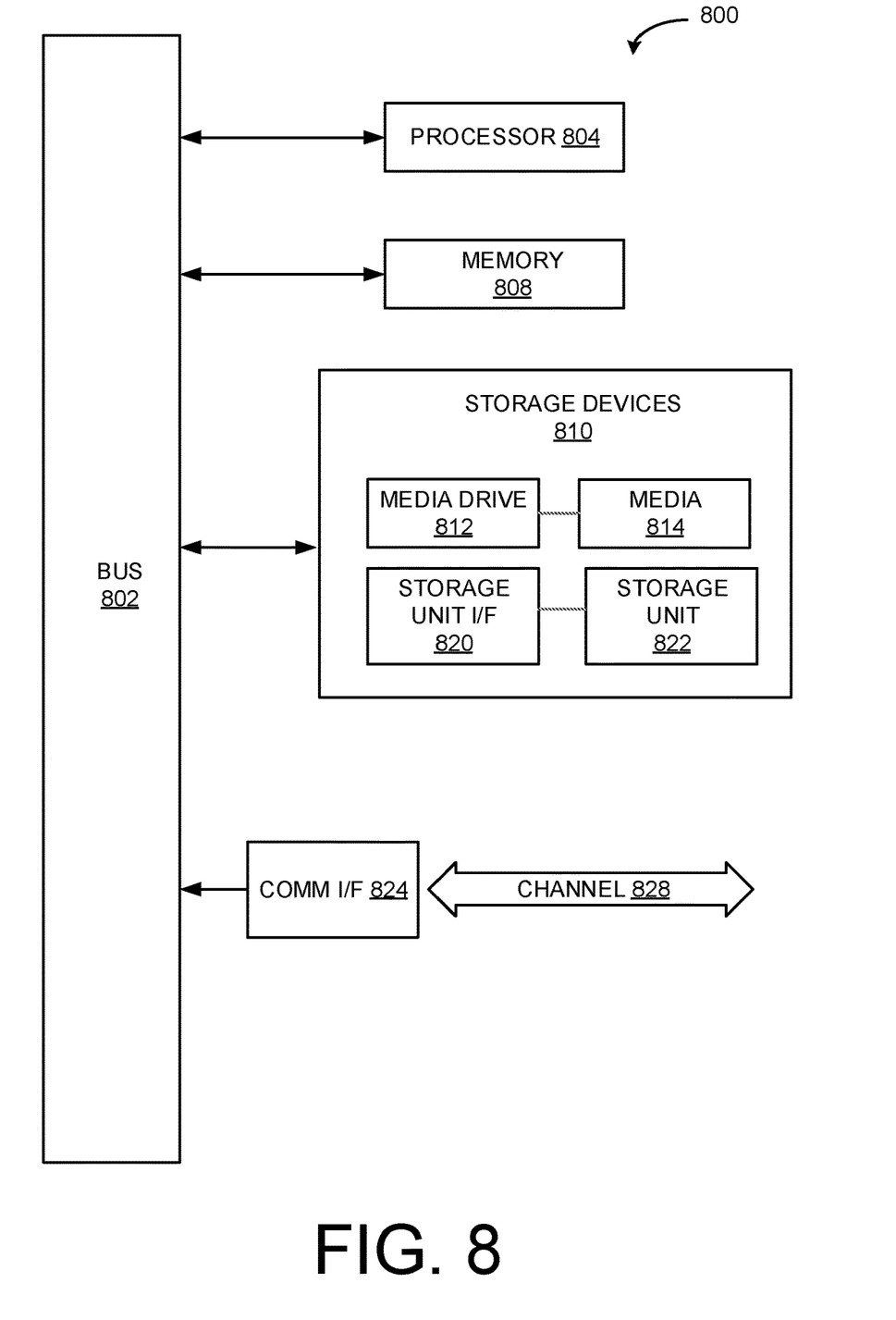
FIG. 8 illustrates an example computing module that may be used to implement various features of the system and methods disclosed herein.

FIG. 8 illustrates an example computing component that may be used to implement various features of the system and methods disclosed herein, such as the aforementioned features and functionality of one or more aspects of location simulation device 160.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the application using other computing modules or architectures.

Referring now to FIG. 8, computing module 800 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid state drive, a magnetic tape drive, an optical disk drive, a CD or DVD drive (R or RW), or other removable or fixed media drive might be provided. Accordingly, storage media 814 might include, for example, a hard disk, a solid state drive, magnetic tape, cartridge, optical disk, a CD, DVD, or Blu-ray, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 808, storage unit 822, and media 814. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A method, comprising:
aligning a plurality of physical markers arranged at separate positions from one another in an outdoor location such that a surface of each of the plurality of physical markers is illuminated by a pair of intersecting collimated light beams emitted by a pair of light emitting devices of another one of the plurality of physical markers, wherein each of the pairs of light beams converge at a known distance that is at least 10 meters from the physical marker that emits the pair of light beams;
capturing by an aerial vehicle flying over the outdoor location, a plurality of aerial images of the outdoor location, wherein the plurality of captured aerial images are captured at different positions over the outdoor location and include a representation of the plurality of aligned physical markers in the outdoor location;
analyzing the plurality of captured aerial images, the known distance of the convergence of the pairs of light beams, and the aligned physical markers to create a scale for the aerial image; and
generating a three-dimensional model of the outdoor location using the plurality of captured images, wherein objects in the three-dimensional model are scaled using the known distance of the convergence of pairs of light beams and the aligned physical markers in the plurality of captured images.

2. The method of claim 1, wherein the plurality of physical markers comprise two physical markers positioned at a first position in the outdoor location and a second position in the outdoor location, respectively, and aligned in a linear configuration.

3. The method of claim 1, wherein the plurality of physical markers comprise three physical markers positioned at three different positions in the outdoor location and aligned in a triangular configuration, or four physical markers positioned at four different positions in the outdoor location and aligned in a rectangular configuration.

4. The method of claim 1, wherein each of the plurality of physical markers comprises a first pair of light emitting devices that emit light beams that converge at a first known distance from the physical marker in a first direction, and a second pair of light emitting devices that emit light beams that converge at a second known distance from the physical marker in a second direction.

5. The method of claim 4, wherein each of the light emitting devices of each of the plurality of physical markers emits light having a wavelength in the visible light spectrum.

6. The method of claim 1, wherein aligning the plurality of physical markers comprises mounting each of the plurality of physical markers on a stand such that each of the plurality of physical markers is level and vertically aligned with each of the other physical markers.

7. The method of claim 1, wherein a top surface of each of the plurality of physical markers comprises a pattern, wherein the method further comprises: determining a center of each of the plurality of physical markers in at least one of the plurality of captured aerial images using at least the pattern.

8. The method of claim 4, wherein each of the first known distance and the second known distance is greater than 10 meters.

9. The method of claim 8, wherein each of the first known distance and the second known distance is greater than 50 meters.

* * * * *